No. 690,318. Patented Dec. 31, 1901.
H. RENOLD.
DRIVE CHAIN.
(Application filed Apr. 19, 1901.)
(No Model.)
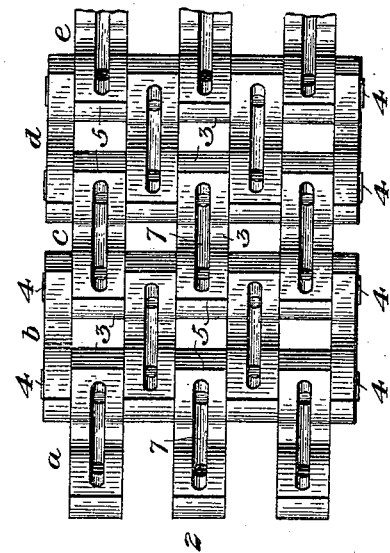
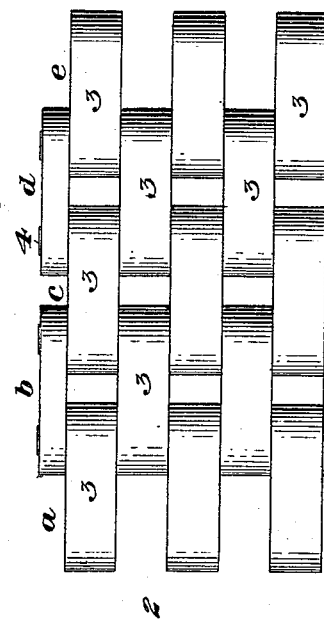
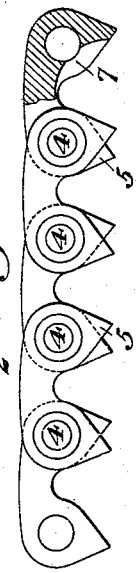
WITNESSES
INVENTOR
Hans Renold
by Bakewell & Bakewell
his Attorneys.

UNITED STATES PATENT OFFICE.

HANS RENOLD, OF MANCHESTER, ENGLAND, ASSIGNOR TO THE EWART MANUFACTURING COMPANY, OF CHICAGO, ILLINOIS, A CORPORATION OF ILLINOIS.

DRIVE-CHAIN.

SPECIFICATION forming part of Letters Patent No. 690,318, dated December 31, 1901.

Application filed April 19, 1901. Serial No. 56,593. (No model.)

*To all whom it may concern:*

Be it known that I, HANS RENOLD, of Manchester, in the county of Lancaster, England, have invented a new and useful Improvement in Drive-Chains, of which the following is a description, reference being had to the accompanying drawings, forming part of this specification, in which—

Figure 1 is a top plan view of my chain. Fig. 2 is a bottom plan view of the same; and Fig. 3 is a side elevation, partly in section.

In the drawings, 2 is a chain made up (series a b c d e) of links 3, the ends of the links of each series being alternated and interposed between the links of the adjoining series and held thereto by pins 4. The links are approximately of V shape, being formed with inwardly-projecting teeth or projections 5 of the form usual in links of this class.

For the purpose of oiling the links perfectly I form in each link on its inner face a slot 7, extending between the projections of the link and into the pin-holes thereof. These slots constitute recesses or pockets for the oil and distribute it to the joints to the best advantage, rendering it more pliable and silent.

Within the scope of my invention the number of links in each series may be varied, and many other changes in the form and construction of the parts may be made by the skilled mechanic.

What I claim is—

A drive-chain composed of links having at their end portions projections adapted to engage a sprocket-wheel, and having slots on their inner faces between the projections extending into the pin-holes; substantially as described.

In testimony whereof I have hereunto set my hand.

HANS RENOLD.

Witnesses:
A. E. PATERSON,
HENRY JONES.